Patented Mar. 20, 1945

2,372,046

UNITED STATES PATENT OFFICE 2,372,046

COMPOSITIONS FOR USE IN AGRICULTURE OR HORTICULTURE

Michael Henry Miller Arnold, Norton-on-Tees, England, assignor to Imperial Chemical Industries Limited, a corporation of Great Britain No Drawing. Application March 11, 1941, Serial No. 382,842. In Great Britain March 13, 1940

13 Claims. (Cl. 167—20)

This invention relates to mixtures which are suitable for pest control.

According to the present invention there are provided mixtures containing sulphur nitride and iminosulphur ($S_7NH$) which can be applied in agriculture and horticulture for the control of fungi and other plant diseases, destructive and injurious insects, and for repelling destrictive birds from seeds.

These mixtures have been found particularly suitable for the dressing of seeds. Up to the present, in order to protect seeds from attack by fungi and to prevent the development of seed-borne diseases, the seeds have been dressed with, e. g., a mercurial preparation, and this treatment has been followed by another to decrease attack by birds. We have found that the effects of both these treatments can be attained to an improved extent by simple treatment of the seeds with mixtures according to the present invention, the use of which, furthermore, does not substantially inhibit the germination of the seed.

The mixtures may also be applied directly to the soil for the control of fungi.

We have further found that mixtures according to the present invention can be applied to growing plants for the control of fungous diseases.

The mixtures may be applied as a powder, as a solution, or as a dispersion in a liquid medium.

Sulphur nitride itself is usually prepared by passing gaseous ammonia into a solution of a chloride of sulphur dissolved in an organic solvent, for example, benzene or chloroform, whereby a precipitate of sulphur nitride, ammonium chloride, and sulphur is obtained. This precipitate is separated by filtration and treated by known means.

As a further feature of the present invention we provide a method for the production of mixtures containing sulphur nitride and iminosulphur, in which the filtrate as usually obtained from the preparation of sulphur nitride as described above, without separating the dissolved constituents, is used as a solvent for further quantities of a chloride or chlorides of sulphur, the solution then being treated with gaseous ammonia, whereby a further quantity of sulphur nitride together with ammonium chloride and sulphur is obtained. After several cycles of the above operations, steady conditions are attained, when it is found that the precipitate obtained contains not only sulphur nitride, sulphur and ammonium chloride, but also iminosulphur. This precipitate, after separation from the solvent and drying, may be used as such for the purposes hereinbefore described, while the filtrate is again used as a solvent for chlorides of sulphur. If desired, the sulphur and/or the ammonium chloride can be removed from the precipitate: when the mixtures of the present invention prepared as hereinbefore described are to be used as a foliage spray, it is, however, desirable to remove only the ammonium chloride, for example, by leaching the precipitate with water, before it is finally dried.

Due to the tendency of sulphur nitride to detonate, it is preferable to use the mixtures of the present invention together with suitable fillers or diluents, such as talc, bentonite, anhydrite and chalk. Such fillers or diluents may be added to the mixtures of the present invention at any stage during their preparation, but when they are prepared as hereinbefore described it is convenient to add such fillers to the reaction mixture before the solids are finally dried.

We have also found it particularly advantageous to use carbon tetrachloride as the organic solvent for the chlorides of sulphur, on the grounds of cheapness, non-inflammability, and the absence of side reactions.

It is also desirable to conduct the preparation of the mixtures at temperatures not less than 20° C., the upper temperature limit being such as to avoid substantial loss of the organic solvent and/or of the solute, by evaporation. More particularly we prefer to operate at temperatures not higher than about 50° C. We also prefer to use dry ammonia.

The following is given by way of an example of the preparation of mixtures comprising sulphur nitride and iminosulphur.

Example I 840 gms. of sulphur monochloride were dissolved in 9 litres of carbon tetrachloride and dry gaseous ammonia passed into the solution until reaction was complete as judged by the reaction mixture attaining a salmon red colour, the temperature being maintained above 20° C., but low enough to prevent substantial loss of carbon tetrachloride by evaporation. The precipitate was filtered off, and the filtrate used for dissolving a further 840 gms. of sulphur monochloride, the solution again being treated with dry gaseous ammonia, the precipitate filtered off and the filtrate again used as a solvent for 840 gms. of sulphur monochloride for treatment with ammonia. This procedure was repeated continuously, when it was found that after 10 cycles, the precipitate had the following percentage composition by weight:

| | Per cent |
|---|---|
| S | 22.5 |
| $S_4N_4$ | 10.5 |
| $S_7NH$ | 4.4 |
| $NH_4Cl$ | 62.6 |

The proportions of sulphur nitride to iminosulphur in the above example could have been varied by replacing part or the whole of the sulphur monochloride by sulphur dichloride, when it would have been found that there was a greater proportion of sulphur nitride in the precipitate, and also an increased ratio of sulphur nitride to iminosulphur.

*Example II*

By operating exactly as described in Example 1, but using a sulphur chloride having a composition corresponding to sulphur dichloride, that is, containing 69% of chlorine, the precipitate obtained had the following composition by weight:

| | Per cent |
|---|---|
| S | 12.0 |
| $S_4N_4$ | 20.0 |
| $S_7NH$ | 3.0 |
| $NH_4Cl$ | 65.0 |

I claim:

1. In a process for the production of mixtures comprising sulphur nitride and iminosulphur, the steps of reacting ammonia with one or more chlorides of sulphur dissolved in an inert organic liquid recycled from a previous operation in which iminosulphur and other products of the reaction have been precipitated whereby iminosulphur and other products of the reaction are formed as a precipitate, separating the precipitate from the solution and returning the said solution to the process as said organic liquid.

2. In a process for the production of mixtures comprising sulphur nitride and iminosulphur, the steps of reacting ammonia with a chloride of sulphur containing 69% of chlorine, the said chloride of sulphur being dissolved in an inert organic liquid, recycled from a previous operation in which iminosulphur and other products of the reaction have been precipitated whereby iminosulphur and other products of the reaction are formed as a precipitate separating the precipitate from the solution and returning the said solution to the process as said organic liquid.

3. In a process for the production of mixtures comprising sulphur nitride and iminosulphur, the steps of reacting ammonia with one or more chlorides of sulphur dissolved in carbon tetrachloride, recycled from a previous operation in which iminosulphur and other products of the reaction have been precipitated whereby iminosulphur and other products of the reaction are formed as a precipitate separating the precipitate from the solution and returning the said solution to the process as said organic liquid.

4. In a process for the production of mixtures comprising sulphur nitride and iminosulphur, the steps of reacting ammonia with a chloride of sulphur containing 69% of chlorine, the said chloride of sulphur being dissolved in carbon tetrachloride, recycled from a previous operation in which iminosulphur and other products of the reaction have been precipitated whereby iminosulphur and other products of the reaction are formed as a precipitate separating the precipitate from the solution and returning the said solution to the process as said organic liquid.

5. In a process for the production of mixtures comprising sulphur nitride and iminosulphur, the steps of reacting substantially water-free ammonia with one or more chlorides of sulphur dissolved in an inert organic liquid, recycled from a previous operation in which iminosulphur and other products of the reaction have been precipitated whereby iminosulphur and other products of the reaction are formed as a precipitate separating the precipitate from the solution and returning the said solution to the process as said organic liquid.

6. In a process for the production of mixtures comprising sulphur nitride and iminosulphur, the steps of reacting substantially water-free ammonia with a chloride of sulphur containing 69% of chlorine, the said chloride of sulphur being dissolved in an inert organic liquid, recycled from a previous operation in which iminosulphur and other products of the reaction have been precipitated whereby iminosulphur and other products of the reaction are formed as a precipitate separating the precipitate from the solution and returning the said solution to the process.

7. In a process for the production of mixtures comprising sulphur nitride and iminosulphur, the steps of reacting substantially water-free ammonia with a chloride of sulphur containing 69% of chlorine, the said chloride of sulphur being dissolved in carbon tetrachloride, recycled from a previous operation in which iminosulphur and other products of the reaction have been precipitated whereby iminosulphur and other products of the reaction are formed as a precipitate separating the precipitate from the solution and returning the said solution to the process.

8. In a process for the production of mixtures comprising sulphur nitride and iminosulphur, the steps of reacting, at temperatures between about 20° C. and 50° C., ammonia with one or more chlorides of sulphur dissolved in an inert organic liquid, recycled from a previous operation in which iminosulphur and other products of the reaction have been precipitated whereby iminosulphur and other products of the reaction are formed as a precipitate separating the precipitate from the solution and returning the said solution to the process as said organic liquid.

9. In a process for the production of mixtures comprising sulphur nitride and iminosulphur, the steps of reacting, at temperatures between about 20° C. and 50° C., ammonia with a chloride of sulphur containing 69% of chlorine, the said chloride of sulphur being dissolved in carbon tetrachloride, recycled from a previous operation in which iminosulphur and other products of the reaction have been precipitated whereby iminosulphur and other products of the reaction are formed as a precipitate separating the precipitate from the solution and returning the said solution to the process as said organic liquid.

10. In a process for the production of mixtures comprising sulphur nitride and iminosulphur, the steps of reacting, at temperatures between about 20° C. and 50° C., substantially water-free ammonia with one or more chlorides of sulphur dissolved in an inert organic liquid, recycled from a previous operation in which iminosulphur and other products of the reaction have been precipitated whereby iminosulphur and other products of the reaction are formed as a precipitate separating the precipitate from the solution and returning the said solution to the process as said organic liquid.

11. In a process for the production of mixtures comprising sulphur nitride and iminosulphur, the steps of reacting, at temperatures between about 20° C. and 50° C., substantially water-free ammonia with a chloride of sulphur containing 69% of chlorine, the said chloride of sulphur being dissolved in an inert organic liquid, recycled from a previous operation in which iminosulphur and other products of the reaction have been precipitated whereby iminosulphur and other products of the reaction are formed as a precipitate separating the precipitate from the solution and returning the said solution to the process as said organic liquid.

12. In a process for the production of mixtures comprising sulphur nitride and iminosulphur, the steps of reacting at temperatures between about 20° C. and 50° C., substantially water-free ammonia with a chloride of sulphur containing 69% of chlorine, the said chloride of sulphur being dissolved in carbon tetrachloride, recycled from a previous operation in which iminosulphur and other products of the reaction have been precipitated whereby iminosulphur and other products of the reaction are formed as a precipitate separating the precipitate from the solution and returning the said solution to the process as said organic liquid.

13. In a process for the production of mixtures comprising sulphur nitride and iminosulphur the steps of reacting ammonia with at least one chloride of sulphur dissolved in an organic solvent for chlorides of sulphur recycled from a previous operation in which iminosulphur and other products of the reaction have been precipitated whereby iminosulphur and other products of the reaction are formed as a precipitate, and separating the precipitate from the solution.

MICHAEL H. M. ARNOLD.